United States Patent [19]
Doerge

[11] Patent Number: 4,960,804
[45] Date of Patent: Oct. 2, 1990

[54] RIGID FOAMS USING BLENDS OF CHLOROFLUOROCARBONS AND ALKYL ALKANOATES AS BLOWING AGENT

[75] Inventor: Herman P. Doerge, Pittsburgh, Pa.

[73] Assignee: Mobay Corporation, Pittsburgh, Pa.

[21] Appl. No.: 502,467

[22] Filed: Mar. 30, 1990

Related U.S. Application Data

[63] Continuation of Ser. No. 321,032, Mar. 9, 1989.

[51] Int. Cl.$^5$ ............................................. C08J 9/14
[52] U.S. Cl. ........................... 521/130; 264/DIG. 5; 521/131; 521/155
[58] Field of Search .................. 521/130, 131, 155; 264/DIG. 5

[56] References Cited

U.S. PATENT DOCUMENTS

| | | | |
|---|---|---|---|
| 2,191,196 | 2/1940 | Fleischer | 62/178 |
| 3,072,582 | 1/1963 | Frost | 260/2.5 |
| 3,091,551 | 5/1963 | Robertson | 117/105 |
| 3,153,002 | 10/1964 | Wismer et al. | 260/2.5 |
| 3,524,825 | 8/1970 | Rill, Jr. | 260/2.5 |
| 3,745,203 | 7/1973 | Harper | 264/48 |
| 3,846,347 | 11/1974 | Satterly | 260/2.5 |
| 3,879,315 | 4/1975 | Watkinson et al. | 260/2.5 |
| 4,033,910 | 7/1977 | Papa | 260/2.5 |
| 4,076,644 | 2/1978 | Burt et al. | 252/182 |
| 4,248,975 | 2/1981 | Satterly | 521/110 |
| 4,448,951 | 5/1984 | Rupert et al. | 528/129 |
| 4,624,970 | 11/1986 | Dwyer et al. | 522/131 |

OTHER PUBLICATIONS

DuPont Brochure entitled "DuPont Freon Fluorocarbons . . . High Performance Blowing Agents".
Union Carbide brochure F-42624A entitled "NIAX Blowing Agents for Urethane Foams," dated Apr. 1973, 15 pages.
Union Carbide brochure F-42624B entitled "NIAX Blowing Agents for Urethane Foams," dated Apr. 1974, 14 pages.
Union Carbide brochure F-46239 entitled "NIAX Blowing Agent 11R", dated 10/76, pages.
Union Carbode brochure entitled "1977-1978 Chemicals and Plastics Physical Properties", 5 pages.

Primary Examiner—Morton Foelak
Attorney, Agent, or Firm—Joseph C. Gil

[57] ABSTRACT

The present invention is directed to the use of a mixture of specific chlorofluorocarbons and an alkyl alkanoate in the production of rigid, closed cell foams.

7 Claims, No Drawings

RIGID FOAMS USING BLENDS OF CHLOROFLUOROCARBONS AND ALKYL ALKANOATES AS BLOWING AGENT

CROSS-REFERENCE TO RELATED APPLICATION

This application is a continuation of U.S. application Ser. No. 07/321,032, filed on Mar. 9, 1989.

BACKGROUND OF THE INVENTION

The use of trichloromonofluoromethane in the production of closed cell, rigid polyurethane and polyisocyanurate foams is well known (see, e.g., U.S. Pat. Nos. 3,072,582; 3,091,551; 3,153,002; 3,524,825; 3,846,347; and 4,248,975). Recently, the urethane foam industry has been investigating methods for reducing the amount of trichloromonofluoromethane used in producing rigid foams.

U.S. Pat. No. 4,448,951 broadly suggests the use of methyl formate as a blowing agent in the production of rigid foams. U.S. Pat. No. 4,033,910 broadly describes the use of a mixture of methyl formate and 1,1,2-trichloro-1,2,2-trifluoroethane in the production of phenolic foams.

U.S. Pat. No. 3,745,203 describes the production of polyurethane moldings using a mixture of two volatile blowing agents. The least volatile of the blowing agents has a boiling point of from 30° F. to 120° F., while the more volatile blowing agent in the mixture has a boiling point of from −50° F. to 50° F. The difference between the boiling points of the two blowing agents in the mixture is from 30° F. to 150° F. Specific mixtures described include methyl formate and either dichlorodifluoromethane or dichlorotetrafluoroethane.

U.S. Pat. No. 3,879,315 describes the use of a mixture of a fluorocarbon (and, specifically, trichloromonofluoromethane) and an alkyl alkanoate having a molecular weight of 74 or less (such as methyl formate) in the production of flexible polyurethane foams.

DuPont has a commercially available blowing agent, known as Freon 11H, which is a blend of methyl formate and trichloromonofluoromethane. Freon 11H has been marketed by DuPont for use in the preparation of flexible polyurethane foams (see, brochure entitled "DuPont Freon Fluorocarbons . . . High Performance Blowing Agents").

Finally, the use of dichlorotrifluoroethane above, and in combination with trichloromonofluoromethane, for producing polyurethane foams is known (see, e.g., U.S. Pat. Nos. 4,076,644 and 4,624,970).

DESCRIPTION OF THE INVENTION

The present invention is directed to the discovery that a mixture of a chlorofluorocarbon having an atmospheric boiling point of from about 74° F. to about 120° F. and an alkyl alkanoate is eminently suitable for the production of closed cell, rigid foams. The resultant foams are substantially lower in density than foams produced from trichloromonofluoromethane alone, yet still have relatively low K-factors. More particularly, the present invention is directed to an improved process for the preparation of closed cell rigid foams. The process broadly comprises reacting (a) a polyol component having a hydroxyl number of from about 200 to about 650, and (b) an organic polyisocyanate, in the presence of (c) a catalyst, (d) a foam stabilizer, and (e) a blowing agent. The improvement resides in the use of a mixture of (i) from 95 to 50 percent by weight, and preferably from 90 to 70 percent by weight, of a chlorofluorocarbon having an atmospheric boiling point of from about 74° F. to about 120° F. and (ii) from 5 to 50 percent by weight, and preferably from 10 to 30 percent by weight, of an alkyl alkanoate having a molecular weight of no more than about 88. The most preferred mixture consists of 18 parts by weight of methyl formate and 82 parts by weight of trichloromonofluoromethane.

Useful chlorofluorocarbons are those having atmospheric boiling points of from about 74° F. to about 120° F. Preferred chlorofluorocarbons are trichloromonofluoromethane (b.p. ~75° F.); 1,1-dichloro-2,2,2-trifluoroethane (b.p. ~82° F.); 1,1-dichloro-1-fluoroethane (b.p. ~90° F.); and trichlorotrifluoroethane (b.p. ~118° F.). More preferred are trichloromonofluoromethane and 1,1-dichloro-2,2,2-trifluoroethane, with trichloromonofluoromethane being the most preferred.

The alkyl alkanoates useful herein have molecular weights of no more than about 88. Specific useful alkanoates are methyl formate, methyl acetate, ethyl formate, ethyl acetate, and butyl formate.

The polyols, isocyanates, catalysts, and foam stabilizers useful herein and the various methods of combining them to produce closed cell, rigid foams are generally known in the art.

The invention is further illustrated but is not intended to be limited by the following examples in which all parts and percentages are by weight unless otherwise specified.

EXAMPLES

In the examples which follow, the following materials were used:

POLYOL A: a 395 OH number polyol prepared by sequentially reacting 1 mole of a mixture of 2,3- and 3,4-toluene diamine with about 3.5 moles of ethylene oxide and then with about 4.5 moles of propylene oxide.

POLYOL B: a 340 OH number aromatic polyester polyol available from Cape Industries.

POLYOL C: a 460 OH number polyol prepared by sequentially reacting 1 mole of an 80/20 mixture of 2,4- and 2,6-toluene diamine with about 3.7 moles of ethylene oxide and then about 3.3 moles of propylene oxide.

POLYOL D: a 250 OH number polyol prepared by reacting glycerin and propylene oxide.

POLYOL E: Stepanol PS-2502, a 250 OH number aromatic polyester polyol commercially available from Stepan Company.

DEG: diethylene glycol.

H$_2$O: water.

R-11: trichloromonofluoromethane.

R-123: 1,1-dichloro-2,2,2-trifluoroethane.

MIX: a mixture of 82 parts of trichloromonofluoromethane and 18 parts of methyl formate.

EF: ethylformate.

MF: methylformate.

L-5440: a polyalkyleneoxidedimethylsiloxane copolymer, commercially available from Union Carbide.

PC-8: Polycat 8 catalyst, a tertiary amine catalyst, commercially available from Air Products.

PMDTA: pentamethyldiethylenetriamine.

K-15: Dabco K-15 catalyst, a potassium based catalyst commercially available from Air Products.

TMR-30: Dabco TMR-30 catalyst, an amine catalyst commercially available from Air Products.

DC-193: a siloxane surfactant commercially available from Dow Corning Corporation.

ISO A: Mondur MR isocyanate, a commercially available polymethylene polyphenyl polyisocyanate from Mobay Corporation, having an NCO content of about 32%.

ISO B: Mondur 489 isocyanate, a commercially available polymethylene polyphenyl polyisocyanate from Mobay Corporation, having an NCO content of about 31%.

In the examples, the ingredients listed in the Table under B-side were first blended. The isocyanate was then mixed in a mixing vessel using an air stirrer. After the mix times noted in the Table, the reaction mixture was poured into a polyethylene lined 10½"×10½"×2½" cardboard box. The cream times, gel times, densities and K-factors of the systems were as reported in the Table.

TABLE 1

| | 1 | 2 | 3 | 4 | 5 | 6 | 7 | 8 | 9 | 10 | 11 | 12 | 13 |
|---|---|---|---|---|---|---|---|---|---|---|---|---|---|
| B-SIDE | | | | | | | | | | | | | |
| POLYOL A, pbw | 70.1 | 70.1 | — | — | — | — | — | — | — | — | — | — | — |
| POLYOL B, pbw | — | — | 21.7 | 21.7 | 21.7 | 21.4 | 21.6 | 21.7 | — | — | — | — | — |
| POLYOL C, pbw | — | — | 53.0 | 53.0 | 53.0 | 52.5 | 52.8 | 53.0 | 62.7 | 62.7 | 62.7 | — | — |
| POLYOL D, pbw | — | — | — | — | — | — | — | — | 12.7 | 12.7 | 12.7 | — | — |
| POLYOL E, pbw | — | — | — | — | — | — | — | — | — | — | — | 100 | 100 |
| DEG, pbw | 3.9 | 3.9 | — | — | — | — | — | — | — | — | — | — | — |
| H₂O, pbw | 0.6 | 0.6 | 1.9 | 1.4 | 1.2 | 1.0 | 1.0 | 1.9 | 1.9 | 1.9 | 1.9 | — | — |
| R-11, pbw | 22.4 | — | 20.5 | — | — | 19.0 | 19.1 | — | 16.3 | 19.9 | — | 40 | 32.8 |
| R-123, pbw | — | — | — | — | — | — | — | — | — | — | 16.3 | — | — |
| MIX, pbw | — | 22.4 | — | 19.3 | 20.5 | — | — | 16.0 | — | — | — | — | — |
| EF | — | — | — | — | — | 3.2 | — | — | — | — | — | — | — |
| MF | — | — | — | — | — | — | 2.6 | — | 3.6 | — | 3.6 | — | 7.2 |
| L-5440, pbw | 1.5 | 1.5 | 1.5 | 1.5 | 1.5 | 1.5 | 1.5 | 1.5 | 1.5 | 1.5 | 1.5 | — | — |
| PC-8, pbw | 1.0 | 1.0 | — | — | — | — | — | — | — | — | — | — | — |
| PMDTA, pbw | 0.5 | 0.5 | 1.4 | 1.4 | 1.4 | 1.4 | 1.4 | 1.4 | 1.3 | 1.3 | 1.3 | — | — |
| K-15, pbw | — | — | — | — | — | — | — | — | — | — | — | 3 | 3 |
| TMR-30, pbw | — | — | — | — | — | — | — | — | — | — | — | 0.6 | 0.6 |
| DC-193, pbw | — | — | — | — | — | — | — | — | — | — | — | 1.5 | 1.5 |
| A-SIDE | | | | | | | | | | | | | |
| ISO A, pbw | 86.4 | 86.4 | 107.1 | 99.4 | 96.4 | 92.5 | 93.0 | 107.1 | 107.8 | 107.8 | 107.8 | — | — |
| ISO B, pbw | — | — | — | — | — | — | — | — | — | — | — | 158.5 | 158.5 |
| RESULTS | | | | | | | | | | | | | |
| Mix time, sec | 4 | 4 | 4 | 4 | 4 | 4 | 4 | 4 | 4 | 4 | 4 | 5 | 5 |
| Cream time, sec | 9 | 10 | 5 | 6 | 7 | 6 | 6 | 6 | 7 | 6 | 6 | 19 | 19 |
| Gel time, sec | 38 | 42 | 26 | 29 | 32 | 31 | 30 | 26 | 43 | 38 | 38 | 43 | 42 |
| Density, pcf | 2.13 | 1.60 | 1.49 | 1.48 | 1.55 | 1.50 | 1.50 | 1.47 | 1.46 | 1.59 | 1.45 | 1.60 | 1.62 |
| BTU-IN K-FACTOR HR-FT² °F. | 0.117 | 0.126 | 0.123 | 0.126 | 0.122 | 0.118 | 0.118 | 0.127 | 0.130 | 0.125 | 0.140 | 0.115 | 0.122 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed:

1. In a process for the preparation of closed cell, rigid foams by reacting (a) a polyol component having a hydroxyl number of from about 200 to about 650, and (b) an organic polyisocyanate, in the presence of (c) a catalyst, (d) a foam stabilizer, and (e) a blowing agent, the improvement wherein the blowing agent comprises of a mixture of (i) from 95 to 50 percent by weight of a chlorofluorocarbon having an atmospheric boiling point of from about 74° F. to about 120° F. and (ii) from 5 to 50 percent by weight of an alkyl alkanoate having a molecular weight of no more than about 88, the percents by weight being based on the total weight of said mixture.

2. The process of claim 1 wherein said chlorofluorocarbon is selected from the group consisting of trichloromonofluoromethane, 1,1-dichloro-2,2,2-trifluoroethane, 1,1-dichloro-1-fluoroethane, and trifluorotrichloroethane.

3. The process of claim 2 wherein said chlorofluorocarbon is selected from the group consisting of trichloromonofluoromethane and 1,1-dichloro-2,2,2-trifluoroethane.

4. The process of claim 3, wherein said chlorofluorocarbon is trichloromonofluoromethane.

5. The process of claim 1, wherein said alkanoate is selected from the group consisting of methyl formate, methyl acetate, ethyl formate, ethyl acetate, and butyl formate.

6. The process of claim 1 wherein said blowing agent comprises (i) from 90 to 70 percent by weight of said chlorofluorocarbon and (ii) from 10 to 30 percent by weight of said alkanoate.

7. The process of claim 1 wherein said blowing agent comprises a mixture of 18 parts by weight of methyl formate and 82 parts by weight of trichloromonofluoromethane.

* * * * *